United States Patent
Rochberger et al.

[11] Patent Number: 6,061,736
[45] Date of Patent: May 9, 2000

[54] ROUTING OVER SIMILAR PATHS

[75] Inventors: Haim Rochberger, Herzeia, Israel; G. Paul Koning, Wilton, N.H.

[73] Assignee: 3Com Corporation, Santa Clara, Calif.

[21] Appl. No.: 09/042,162

[22] Filed: Mar. 13, 1998

[51] Int. Cl.[7] .............................. G06F 13/38; G06F 15/17
[52] U.S. Cl. ............................................. 709/241; 370/406
[58] Field of Search .................................... 709/241, 238, 709/242, 243; 370/380, 392, 396, 406, 409

[56]  References Cited

U.S. PATENT DOCUMENTS

| | | | |
|---|---|---|---|
| 5,117,422 | 5/1992 | Hauptschein et al. | 370/406 |
| 5,251,205 | 10/1993 | Callon et al. | 370/392 |
| 5,481,604 | 1/1996 | Minot . | |
| 5,854,899 | 12/1998 | Callon et al. | 709/238 |
| 5,940,396 | 8/1999 | Rochberger . | |
| 5,946,295 | 8/1999 | Sofman et al. | 709/241 |
| 5,964,841 | 10/1999 | Rekhter | 709/242 |

OTHER PUBLICATIONS

Meyers, R.A.; Encyclopedia of Telecommunications; "Intelligent Network Switches"; pp. 172–173; ISBN 0–12–226691–9; Academic Press, Inc., 1989.

Stallings, W.; Data and Computer Communications; "Route Discovery and Selection"; pp. 486–487; ISBN 0–02–415425–3; Prentice–Hall, Inc., 1997.

Handel, R. et al.; ATM Networks, Concepts, Protocols, Applications; "Self–Routing Switching Elements"; pp. 181–183; ISBN 0–201–42274–3; Addison–Wesley Publishing Company, 1994.

*Primary Examiner*—Mark H. Rinehart
*Attorney, Agent, or Firm*—McGlew and Tuttle, P.C.

[57]  ABSTRACT

The routing paths are determined in a step-by-step nature. A Dijkstra algorithm is used and before labeling a link as a routing path, all possible routing paths which are within a predetermined range are compared. One of the paths in the range are chosen at random to be the routing path.

14 Claims, 3 Drawing Sheets

LINKS FROM TWICE TENTATIVE NODES AND RESPECTIVE ROUTING PATHS ARE COMPARED TO DETERMINE POSSIBLE PATHS WITHIN A PREDETERMINED RANGE OF A MOST OPTIMAL PATH

RANDOMLY CHOOSE ONE LINK OF THE POSSIBLE PATHS WITHIN THE RANGE AS A ROUTING PATH AND LABEL THAT LINK AND CORRESPONDING NODE AS A ROUTING PATH AND PATH NODE RESPECTIVELY

AND CORRESPONDING ROUTING PATHS TO LINKS ONCE LABEL TENTATIVE NODES ARE COMPARED TO DETERMINED POSSIBLE PATHS WITHIN A PREDETERMINED RANGE OF A MOST OPTIMAL PATH

RANDOMLY CHOOSE ONE LINK OF THE POSSIBLE PATHS WITHIN THE RANGE AS A ROUTING PATH AND LABEL THAT LINK AND CORRESPONDING NODE AS A ROUTING PATH AND PATH NODE RESPECTIVELY

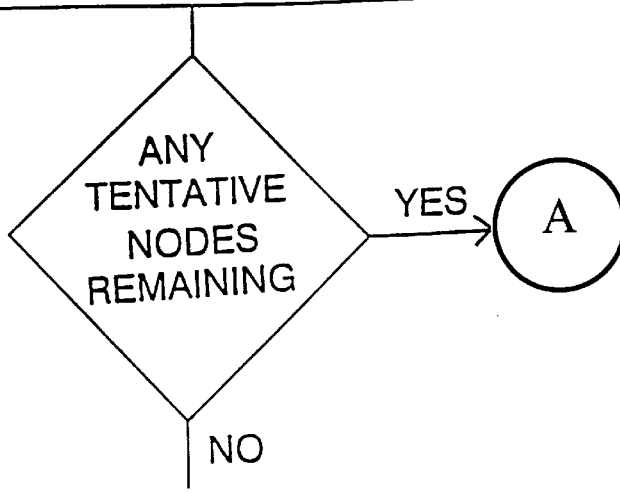

FIG. 2B

ROUTING OVER SIMILAR PATHS

FIELD OF THE INVENTION

The present invention relates to selecting a communication path in a computer network, and in particular to a routing algorithm which prevents congestion caused by the same paths constantly being chosen, when significantly similar paths are available.

BACKGROUND OF THE INVENTION

In computer networks with a plurality of nodes and a plurality of links linking the nodes to each other, there can be more than one path connecting one node to another. A path from a source or root node to a destination node, can use a first set of links and nodes, or a second set of links and nodes. This situation is similar to other forms of travel, when there are many different routes that one can take from point A to point B. In the interest of efficiency, the different routes are compared and the most optimal route based on the characteristics or metrics of the route is chosen.

As computer networks get larger and larger, and as more people both use the network and find new uses for the network, the amount of traffic on the best links and nodes increases dramatically. When each node desires to communicate with another node, the most optimum path is selected. As a consequence, the nodes and links which have the most optimum metrics, are continuously selected. These nodes and links therefore carry a majority of the network traffic. These most optimum links and nodes consequently easily and rapidly become congested. All this congestion in the nodes can reduce the performance of these nodes, not only in forwarding traffic, but also in their local operations.

Significantly similar paths may exist to the most optimum path where the difference between the most optimum paths and significantly similar paths are minute. However, because the selection of a routing path selects the most optimum path, significantly similar paths are ignored.

As computer networks grow, the possibility of significantly similar routing paths increases. However, these significantly similar routing paths will not be chosen, even if they are minutely less optimal. As a result, increases in traffic due to increases in network size are handled by the same links and nodes and this increases congestion, when the availability of alternate paths due to the increase in network size could reduce congestion.

SUMMARY AND OBJECTS OF THE INVENTION

It is a primary object of the present invention to reduce congestion by selecting routing paths which can be suboptimal, especially if the difference between the optimal and suboptimal routing path is less than a predetermined amount.

It is another object of the present invention to select suboptimal paths automatically or efficiently, without the need of a network operator.

It is still another object of the present invention to have the selected routing paths evenly distributed among available optimal and suboptimal paths.

The present invention accomplishes this objective by modifying the way a root node determines which paths will connect the root node to the destination node. The present invention uses a Dijkstra algorithm with a comparison feature and a randomizer at one or more steps during the forming of possible routing paths.

To begin the determination of routing paths from a root node to the other nodes in a network, the present invention begins with the basic process of first labeling all nodes directly connected to the root node as a tentative node. The metrics of the links connecting the root node to the tentative nodes are obtained and compared. The most optimal link is chosen as a routing path. The node connected to the routing path is then labeled as a path node. All nodes directly connected to the new path node, except for the original root node are then also labeled as tentative nodes. If one node is labeled twice as a tentative node, this means that there are two path nodes, each with their own routing path, that can connect to this twice labeled tentative node. The connections of the twice labeled tentative node to these two path nodes, and their corresponding routing paths are compared to determine which connection would provide the most optimal routing path. Once the link providing the most optimal routing path is determined, that link is made a routing path and the twice labeled tentative node is labeled as a regular tent node, the change is that as a tentative node, it has a "better" path to it. To become a "path labeled node" it must wait until it is selected as the "best" from the tent nodes. One must realize that there could be more then two paths from the root to that tent node. So the only time that a node is marked as "path" node—is when selected from the whole group of "tent" nodes. This process is repeated for each twice labeled tentative node.

Once all the twice labeled tentative nodes have been labeled as path nodes, the links from the remaining tentative nodes to their respective path nodes and respective routing paths, are compared. The tentative node with the most optimum corresponding link and routing path is labeled a path node, and its corresponding link is labeled as a routing path. All the nodes directly connected to this new path node are then labeled as tentative nodes, unless those nodes are already path nodes.

The above process is continued for all twice and once labeled tentative nodes until there are no longer any tentative nodes. In this way, routing paths are determined from the root node to each other node in the network.

The above process is then modified. In particular, whenever two or more possible paths are compared, all the possible paths that are within a predetermined difference from the most optimum path are determined and are considered to be significantly similar paths. Of these significantly similar paths, one path is then randomly chosen to be the routing path. If the randomizing is chosen to have a uniform probability, the traffic will be uniformally statistically distributed among the significantly similar links.

In another embodiment, it is possible to have the randomizing weighted according to the difference between each significantly similar link and the most optimal link. In this way the most optimal links will statistically carry more traffic than the other links, however the traffic will still be disbursed and congestion avoided. The weighting based on difference between links, and the maximum predetermined difference by which a possible path is considered significantly similar, can be adjusted to redistribute network traffic and avoid congestion.

The determining of significantly similar, and the correspondingly random choice, of the present invention can occur during the comparison for twice labeled tentative nodes, and/or when there are no twice labeled nodes, and one of the possible paths to the remaining tentative nodes is selected.

If the determination of significantly similar paths and randomizing is performed at a plurality of different comparison steps during the formation of a routing path from one node to another, it is statistically possible that each random choice could choose the worst of the significantly similar paths and the difference between the chosen routing path, and the most optimal routing path could become very large. To overcome this, in one embodiment the maximum acceptable deviation from a most optimal routing path is determined, and this amount is divided by the average number of links in a routing path. The result is then used to determine if a routing path is significantly similar at each comparison step.

In another embodiment to prevent the routing path from significantly deviating from the most optimal routing path, the maximum acceptable deviation is divided by either the number of links present in the routing path considered, or the average number of links in all present routing paths. Also a default number can be used instead of the number of links, when the number of links is small. When the number of links increases beyond the default number, the number of links is then used.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 2A & 2B are a flow chart of the method of the present invention.

DETAILED DESCRIPTION OF THE PREFERRED EMBODIMENTS

Figure 1:
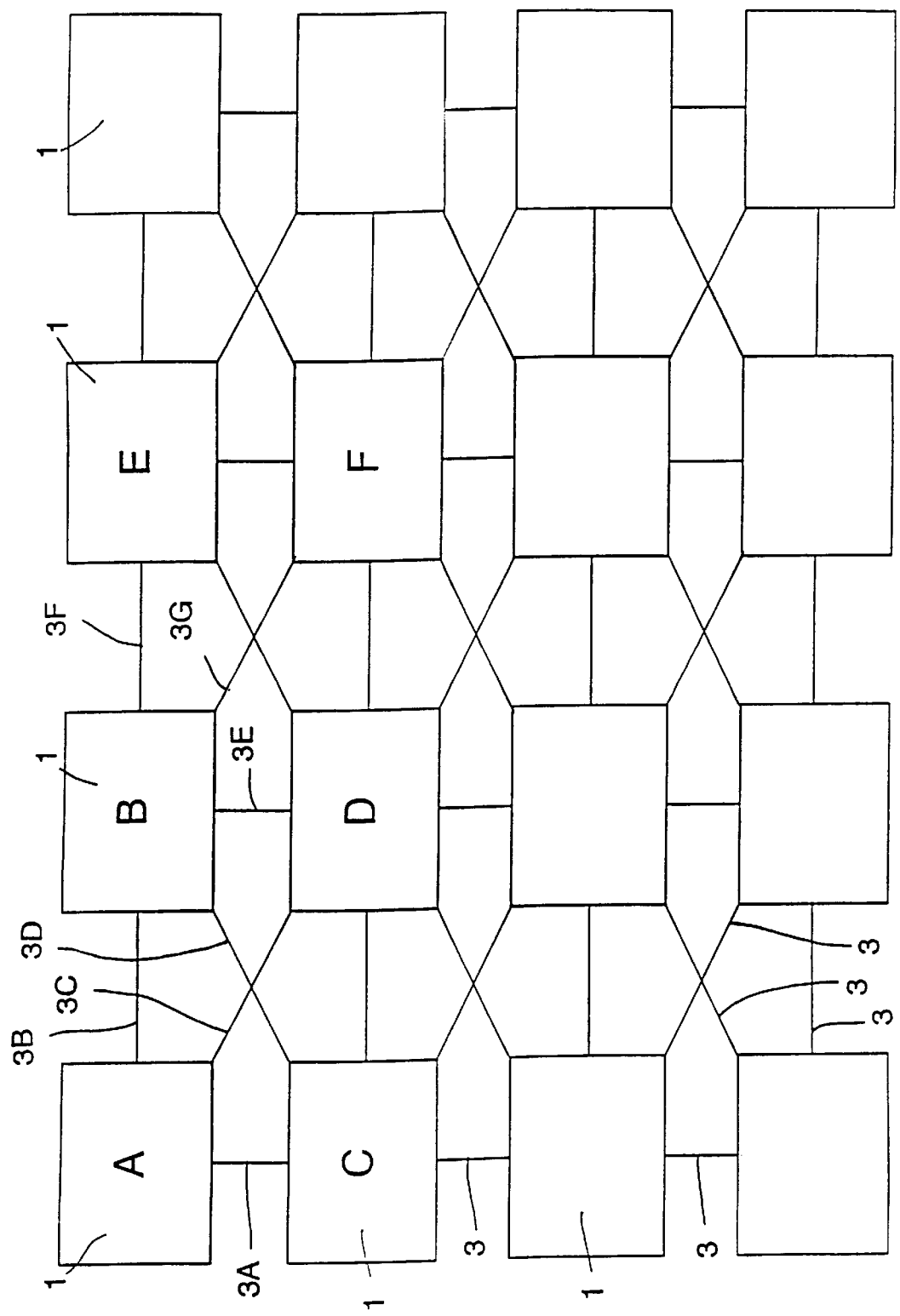
FIG. 1 is a schematic view of a plurality of nodes connected by a plurality of links.

Referring to the drawings, especially FIG. 1, a plurality of nodes 1 are connected to each other by a plurality of links 3. If node A is chosen as a root node, then in the first step of the routing algorithm, nodes B, C and D are considered tentative nodes, since they are directly connected by links 3 to node A. In the next step the metrics of links 3A, 3B and 3C are compared to determine the most optimal link. If link 3A is found to be the most optimal link, links 3B and 3C are compared with link 3A to determine if they are within a predetermined range of link 3A. If link 3B is found to be within the predetermined range of link 3A, one of links 3A and 3B is randomly chosen to be labeled as a routing path.

As an example, it will be considered that link 3B was randomly chosen as a routing path. Node B is then made a path node and all nodes directly connected to path node B are then labeled as tentative nodes, unless they are already a path node, as for example node A which by being the root node, is automatically considered a path node. This labeling of tentative nodes caused by the new path node B, relabels nodes C and D as tentative nodes and adds nodes E and F to the list of tentative nodes.

Since nodes C and D have been twice labeled as tentative nodes, they are preferably examined first, but individually. The possible paths from root node A to twice labeled tentative node C are compared. In particular one possible path is over link 3A, and another possible pair is over link 3B to node B, and then over link 3D to node C. The most optimal possible path is determined, and then it is determined if the remaining possible paths are within the predetermined range of the most optimal path. As an example, assume that path 3A was the most optimal, and the path consisting of link 3B, node B and link 3D was within the predetermined range of possible path 3A. Then one of these two possible paths would be chosen at random to be the routing path from node A to node C. If the possible routing path having link 3A was chosen, 3A would then be labeled a routing path, and link 3D would be ignored. If the possible path including link 3D was chosen, link 3D would be labeled a routing path, and link 3A would be ignored.

If link 3A was the most optimal possible path and the other link was outside of the predetermined range, link 3D would be ignored.

Likewise, possible paths are determined for node D, which in the example of FIG. 1, one possible path would consist of link 3C, and another possible path would consist of link 3B, node B and link 3E. Whichever path is chosen, the corresponding new link will be labeled as a routing path, and the other link will be ignored. Nodes C and D are considered as regular or once labeled tentative nodes.

Again, at the point nodes C, D, F and E are all in "tent" list, and choose one with the "best" optimize to become marked as "path", and here consider again the suboptimum—if in the predetermine range . . . The possible paths from root node A to tentative nodes C, D, E and F are then considered using the already known routing paths and the new links 3F and 3G. The routing paths including link 3F to node E is compared with the routing path to node F using link 3G, and the best routing path to C, and D. The most optimal routing path is determined, and then the remaining routing path, or paths if more nodes are present, is checked to see if it is within the predetermined range of the most optimal. If it is in the range, one of the two paths are chosen at random, and if it is not within range, the most optimal path is chosen. The corresponding link is then labeled as a routing path, and the corresponding node is labeled as a path node. All the nodes directly connected to the recently labeled path nodes are then labeled as tentative nodes and the process repeats until there are no more tentative nodes.

Figure 2A:
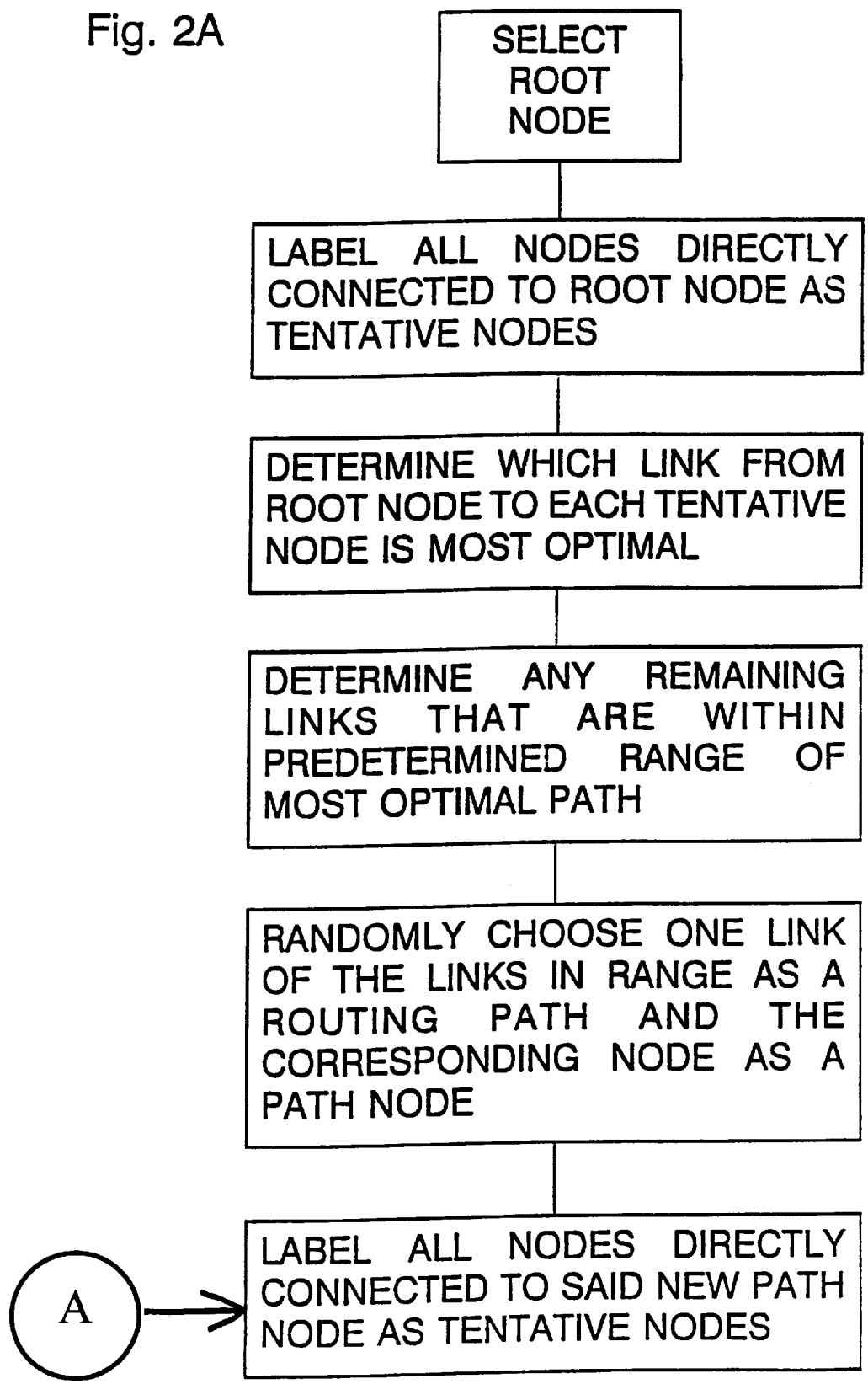

FIG. 2 shows a flow chart of the steps of the present invention from selecting a root node, to eliminating all tentative nodes.

If the configuration percentage of similar routes, is used for the configuration for similar PATHS, then the above might cause a much bigger offset from the "best" path: since this percentage is used for each node along the path, since each hop along the path will might choose, at the worse case, the worse optimized path. And the accumulation of all the offsets can be far then expected (in the worse case).

There are a few solutions for the above problem:

1) When the Net manager configures the percentage, he should divide the percentage to the average number of hops, so that the accumulated "worse case" percentage will not exceed the maximum.

2) A manager will configure a default number of hops assumed, now he can set the feature to work in "learn hops" mode. If so, then on the first route calculation, the percentage will be the result of the percentage divided by the configured number of hops. Then, after each route calculation, the node will make a new "hops#" which is the average of all the route hops up to now.

This way, the system will eventually learn the number of hops for it's typical route destination, since it is very likely that he will always route to the same bunch of destination addresses, And from the hops# , one can calculate the percentage for each offset from the "best".

Note that the number of hops is the element that can be used by the manager to be conservative or not in the assumption that the "worst case"—which is that case where each time the algorithm will choose the worse node to be put on the path, or not. The bigger the hops# is —the better chance is that the chosen path will be within the percentage boundary, Yet the price is that the possible chosen path will all be closer to the "real best", and vice versa.

While specific embodiments of the invention have been shown and described in detail to illustrate the application of the principles of the invention, it will be understood that the invention may be embodied otherwise without departing from such principles.

What is claimed is:

1. A method for determining routing paths in a computer network, the method comprising the steps of:
    providing a plurality of nodes with a plurality of links, each of said plurality of links having a metric;
    selecting one of said nodes as a root node;
    labeling all nodes directly connected to said root node by said links as tentative nodes;
    labeling a most optimum link connecting said root node to said tentative nodes based on said metrics as a routing path;
    changing said tentative node connected to said root node by said routing path to a path node;
    labeling all non-path nodes directly connected to said path node as tentative nodes;
    for each of said nodes twice labeled as tentative nodes, determining a difference between two most optimum paths of said links connecting said root node to said each twice labeled tentative node, when said difference is above a predetermined difference amount a most optimum path of said two most optimum paths is labeled as a routing path, when said difference is below said predetermined difference amount one of said two most optimum paths is randomly labeled as a routing path;
    labeling a most optimum link connecting said root node to said tentative nodes as a routing path based on said metrics;
    changing said tentative nodes connected to said root node by said routing paths to a path node;
    repeating the method steps from said twice labeled tentative node until no tentative nodes are present.

2. A method in accordance with claim 1, further comprising determining an average maximum acceptable deviation for a metric of a routing path to differ from a most optimum routing path;
    determining an average number of links in said routing paths;
    dividing said average maximum acceptable deviation by said average number of links to determine said predetermined difference amount.

3. A method in accordance with claim 1, further comprising determining a desired maximum acceptable deviation for a metric of a routing path to differ from a most optimum routing path;
    counting a number of links in each said routing path;
    dividing said desired maximum acceptable deviation by said counted number of links to determine said predetermined difference amount for each said twice tentatively label node.

4. A method in accordance with claim 3, wherein:
    said counting starts from a number greater than one.

5. A method in accordance with claim 1, further comprising determining a desired maximum acceptable deviation for a metric of a routing path to differ from a most optimum routing path;
    determining an average number of links in all said routing paths present when operating on a twice tentatively labeled node;
    dividing said desired maximum acceptable deviation by said average number of links to determine said predetermined difference when labeling a routing path for a twice tentatively label node.

6. A method in accordance with claim 5, wherein:
    a default number of links is determined;
    when said default number of links is greater than said average number of links, said predetermined difference is determined by dividing said desired maximum acceptable deviation by said default number of links;
    when said default number of links is less than said average number of links, said predetermined difference is determined by dividing said desired maximum acceptable deviation by said average number of links.

7. A method in accordance with claim 5, wherein:
    a default number of links is determined;
    during a first labeling of a routing path of a twice tentatively labeled node, said predetermined difference is determined by dividing said desired maximum acceptable deviation by said default number of links.

8. A method for determining routing paths in a computer network, the method comprising the steps of:
    providing a plurality of nodes with a plurality of links, each of said plurality of links having a metric;
    selecting one of said nodes as a root node;
    labeling all nodes directly connected to said root node by said links as tentative nodes;
    labeling a most optimum link connecting said root node to said tentative nodes based on said metrics as a routing path;
    changing said tentative node connected to said root node by said routing path to a path node;
    labeling all nodes directly connected to said path node as tentative nodes;
    determining a difference between two most optimum paths of said links connecting said root node to said tentative nodes, when said difference is above a predetermined difference amount a most optimum path of said two most optimum paths is labeled as a routing path, when said difference is below said predetermined difference amount one of said two most optimum paths is randomly labeled as a routing path;
    changing said tentative nodes connected to said root node by said routing paths to a path node;
    repeating the method steps from said labelling of all nodes as tentative nodes until no tentative nodes are present.

9. A method in accordance with claim 8, wherein:
    for each of said nodes twice labeled as tentative nodes by more than one path node, a difference in metrics is determined between two most optimum paths of said links connecting said root node to said each twice labeled tentative node, when said difference is above said predetermined difference amount a most optimum path of said two most optimum paths is labeled as a routing path, when said difference is below said predetermined difference amount one of said two most optimum paths is randomly labeled as a routing path.

10. A method in accordance with claim 9, further comprising determining an average maximum acceptable deviation for a metric of a routing path to differ from a most optimum routing path;

determining an average number of links in said routing paths;

dividing said average maximum acceptable deviation by said average number of links to determine said predetermined difference amount.

11. A method in accordance with claim 9, further comprising determining a desired maximum acceptable deviation for a metric of a routing path to differ from a most optimum routing path;

determining an average number of links in all said routing paths present when labeling routing paths;

dividing said desired maximum acceptable deviation by said average number of links to determine said predetermined difference when labeling a routing path.

12. A method for determining routing paths in a computer network, the method comprising the steps of:

applying the Dijkstra algorithm to a root node and a plurality of other nodes connected by a plurality of links;

for each of said nodes twice labeled as tentative nodes by the Dijkstra algorithm, a difference between a set of most optimum paths of said links connecting said root node to said each twice labeled tentative node is determined, when said difference is above a predetermined difference amount a most optimum path of said set of most optimum paths is labeled as a routing path, when said difference is below said predetermined difference amount one of said set of most optimum paths is randomly labeled as a routing path.

13. A method in accordance with claim 12, further comprising determining an average maximum acceptable deviation for a metric of a routing path to differ from a most optimum routing path;

determining an average number of links in said routing paths;

dividing said average maximum acceptable deviation by said average number of links to determine said predetermined difference amount.

14. A method in accordance with claim 12, further comprising determining a desired maximum acceptable deviation for a metric of a routing path to differ from a most optimum routing path;

determining an average number of links in all said routing paths present when labeling a routing path;

dividing said desired maximum acceptable deviation by said average number of links to determine said predetermined difference when labeling a routing path.

* * * * *